US012597117B2

(12) United States Patent     (10) Patent No.: US 12,597,117 B2
Kikuchi et al.                     (45) Date of Patent:     Apr. 7, 2026

(54) METHOD, PROGRAM, APPARATUS, AND SYSTEM FOR ABNORMALITY DETECTION SUCH AS FOR DETERMINING WHETHER A PLURALITY OF CONTAINERS TO BE STACKED ON A PALLET IS NORMAL OR ABNORMAL

(71) Applicant: TOYO SEIKAN CO., LTD., Tokyo (JP)

(72) Inventors: Takayuki Kikuchi, Yokohama (JP); Junichi Takada, Yokohama (JP); Kazuhiko Nakayama, Yokohama (JP); Taketoshi Manou, Yokohama (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 268 days.

(21) Appl. No.: 18/349,408

(22) Filed: Jul. 10, 2023

(65) Prior Publication Data

US 2023/0351578 A1     Nov. 2, 2023

Related U.S. Application Data

(63) Continuation of application No. PCT/JP2022/006055, filed on Feb. 16, 2022.

(30) Foreign Application Priority Data

Mar. 1, 2021     (JP) ................................. 2021-031503

(51) Int. Cl.
*G06T 7/00*          (2017.01)
*G06T 5/50*          (2006.01)
(Continued)

(52) U.S. Cl.
CPC .............. *G06T 7/0008* (2013.01); *G06T 5/50* (2013.01); *G06T 5/70* (2024.01); *G06V 10/24* (2022.01); *G06T 2207/20224* (2013.01)

(58) Field of Classification Search
None
See application file for complete search history.

(56) References Cited

U.S. PATENT DOCUMENTS

2018/0157933 A1* 6/2018 Brauer ................. G06N 3/0464
2018/0194573 A1   7/2018 Iwai et al.
(Continued)

FOREIGN PATENT DOCUMENTS

CN        101710080 A      5/2010
CN        102602693 A      7/2012
(Continued)

OTHER PUBLICATIONS

Communication dated Nov. 26, 2024 issued by the Japanese Patent Office in application No. 2021-031503.
(Continued)

*Primary Examiner* — Henok Shiferaw
(74) *Attorney, Agent, or Firm* — Sughrue Mion, PLLC

(57)               ABSTRACT

An abnormality detection method includes: acquiring a determination target image that is an image of a determination target object to be regularly aligned while standing, which is a cylindrical container; creating a difference image emphasizing a difference between an image of a normal determination target object regularly aligned and the determination target image; calculating a multi-segmentation error of the difference image to determine a maximum value of the multi-segmentation error; and determining whether the determination target object is normal or abnormal in accordance with the maximum value.

9 Claims, 7 Drawing Sheets

(51) Int. Cl.
  *G06T 5/70* (2024.01)
  *G06V 10/24* (2022.01)

(56) References Cited

U.S. PATENT DOCUMENTS

| | | | |
|---|---|---|---|
| 2020/0074238 A1 * | 3/2020 | Umeno | G06F 18/24 |
| 2020/0111217 A1 * | 4/2020 | Yokoyama | G01N 21/8851 |
| 2021/0295485 A1 | 9/2021 | Miyazawa | |
| 2021/0304363 A1 | 9/2021 | Makihira et al. | |
| 2021/0383526 A1 * | 12/2021 | Chen | G06V 10/82 |
| 2022/0020135 A1 | 1/2022 | Tsutsukawa et al. | |
| 2022/0028072 A1 | 1/2022 | Kondo et al. | |

FOREIGN PATENT DOCUMENTS

| | | | |
|---|---|---|---|
| CN | 102991998 A * | 3/2013 | |
| CN | 108284443 A | 7/2018 | |
| CN | 110036279 A | 7/2019 | |
| CN | 110866891 A | 3/2020 | |
| CN | 111434592 A | 7/2020 | |
| CN | 111754513 A | 10/2020 | |
| CN | 113016023 A | 6/2021 | |
| JP | 3-251386 A | 11/1991 | |
| JP | 2011-111319 A | 6/2011 | |
| JP | 201373452 A | 4/2013 | |
| JP | 2013073452 A * | 4/2013 | |
| JP | 2018-5773 A | 1/2018 | |
| JP | 2020-103880 A | 7/2020 | |
| JP | 2020-158261 A | 10/2020 | |
| WO | 2014/181285 A1 | 11/2014 | |
| WO | 2020/235461 A1 | 11/2020 | |
| WO | WO-2021191908 A1 * | 9/2021 | G06N 3/088 |

OTHER PUBLICATIONS

International Preliminary Report on Patentability with a Translation of Written Opinion in International Application No. PCT/JP2022/006055, issued on Aug. 29, 2023.

International Search Report dated Apr. 12, 2022 issued by the International Searching Authority in application No. PCT/JP2022/006055.

Office Action dated Jul. 9, 2025 in Taiwanese Application No. 111107008.

Communication dated Jun. 24, 2025 in Chinese Application No. 202280009129.1.

* cited by examiner

START

ACQUIRE IMAGE — S11

PROCESS WITH AUTOENCODER — S12

GENERATE DIFFERENCE IMAGE — S13

CALCULATE MULTI-SEGMENTATION SQUARED ERROR — S14

DETERMINE MAXIMUM VALUE OF SQUARED ERROR — S15

DETERMINE ABNORMALITY — S16

END

METHOD, PROGRAM, APPARATUS, AND SYSTEM FOR ABNORMALITY DETECTION SUCH AS FOR DETERMINING WHETHER A PLURALITY OF CONTAINERS TO BE STACKED ON A PALLET IS NORMAL OR ABNORMAL

CROSS REFERENCE TO RELATED APPLICATIONS

This application is a Rule 53(b) Continuation of International Application No. PCT/JP2022/006055 filed on Feb. 16, 2022, claiming priority based on Japanese Patent Application No. 2021-031503 filed on Mar. 1, 2021, the respective disclosures of all of the above of which are incorporated herein by reference in their entirety.

TECHNICAL FIELD

The disclosure relates to abnormality detection.

BACKGROUND

In the manufacturing process of containers, containers that are being manufactured or have been manufactured may commonly be regularly aligned. For example, the containers are regularly aligned and stacked on pallets at the shipment of the manufactured containers. JP 2011-111319 A discloses a technique related to a palletizer that stacks cans on pallets, for example.

SUMMARY

In the process that needs containers to be regularly aligned, an abnormality such as omission of containers, some fallen containers that needs to be standing, or misalignment needs to be eliminated. Thus, appropriately detecting such an abnormality is awaited.

An object of the disclosure is to appropriately detect an abnormality of the state of containers.

An abnormality detection method according to an aspect of the disclosure includes: acquiring a determination target image that is an image of a determination target object to be regularly aligned while standing, which is a cylindrical container; creating a difference image emphasizing a difference between an image of a normal determination target object regularly aligned and the determination target image; calculating a multi-segmentation error of the difference image to determine a maximum value of the multi-segmentation error; and determining whether the determination target material is normal or abnormal in accordance with the maximum value.

The disclosure can appropriately detect an abnormality of the state of containers.

DESCRIPTION OF EMBODIMENTS

An embodiment is described with reference to the drawings. The present embodiment relates to a palletizer system. This palletizer system is used in the final stage of the manufacturing process of cans, which are a type of bottomed cylindrical containers, and regularly aligns and stacks the manufactured cans on a pallet for shipment. The palletizer system of the present embodiment includes an abnormality detection system configured to detect, for example, omission of cans, fallen cans, and misalignment that may occur in stacking, and prevents the occurrence of omission, being fallen over, misalignment, and the like of cans.

Configuration and Operation of Palletizer System

Palletizer

Figure 1:
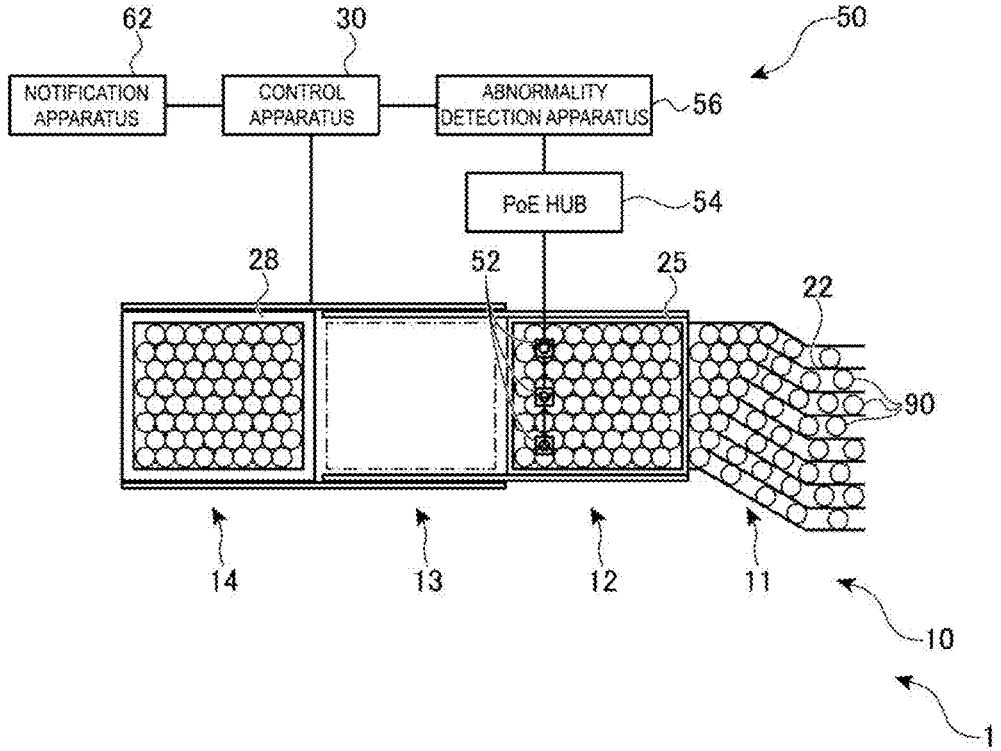
FIG. 1 is a schematic diagram illustrating an outline of a configuration example of a palletizer system according to an embodiment.

FIG. 1 is a schematic diagram illustrating an outline of a configuration example of a palletizer system 1 according to the present embodiment. The palletizer system 1 includes a palletizer 10 that stacks manufactured empty cans on a pallet for shipment, and a control apparatus 30 configured to control the operation of the palletizer 10. The palletizer 10 regularly aligns cans 90 standing with their bottoms down for each tier. The palletizer 10 stacks the aligned cans 90 on the pallet by the predetermined number of tiers with a separate sheet sandwiched therebetween for each tier. In FIG. 1, the manufactured cans 90 are conveyed from right to left. The palletizer 10 includes a supply unit 11, an alignment unit 12, a transfer unit 13, and a palletizing unit 14 in the order from the upstream side to the downstream side.

The manufactured cans 90 are supplied from the supply unit 11 to the palletizer 10. The supply unit 11 is provided with partition plates 22 corresponding to the number of rows of the cans 90 to be aligned, and the cans 90 are aligned in the predetermined number of rows and supplied to the alignment unit 12. The cans 90 are tightly packed in the alignment unit 12, and thus the cans 90 are regularly aligned.

The palletizer 10 is provided with a pushing machine 25 that reciprocates between the alignment unit 12 and the transfer unit 13. When one or more tiers of the cans 90 to be placed on the pallet are aligned in the alignment unit 12, the pushing machine 25 pushes one tier of the aligned cans 90 toward the transfer unit 13. One tier of the cans 90 waits at the transfer unit 13 until being stacked.

The palletizing unit 14 is provided with a lifting apparatus. A pallet is placed on the lifting apparatus. The lifting apparatus aligns the height of the separate sheet where the cans 90 are placed with the height of the transfer unit 13. The palletizer 10 is provided with a transfer machine 28 that reciprocates between the transfer unit 13 and the palletizing unit 14. The transfer machine 28 places one tier of the cans 90 waiting at the transfer unit 13 on the separate sheet of the palletizing unit 14. The lifting apparatus then lowers the pallet by the height of one tier. The separate sheet is placed on the cans 90, and its height is aligned with the height of the transfer unit 13.

When the cans 90 are stacked at the palletizing unit 14 and the transfer unit 13 is emptied, the pushing machine 25 repeatedly pushes one tier of the aligned cans 90 from the alignment unit 12 to the transfer unit 13. The transfer machine 28 repeatedly places, by the predetermined number of tiers, one tier of the cans 90 waiting at the transfer unit 13 on the separate sheet of the palletizing unit 14. In this manner, the cans 90 regularly and tightly aligned are stacked on the pallet by the predetermined number of tiers. When the predetermined number of tiers of the cans 90 are stacked, they are bundled with a band, wrapped with a shrink film, and shipped.

Abnormality Detection System

The palletizer 10 of the palletizer system 1 of the present embodiment is provided with an abnormality detection system 50. The abnormality detection system 50 detects abnormality in the cans 90 to be stacked on the pallet, such as an omitted can that is caused by a gap corresponding to one can generated in the aligned cans 90 and makes the number of the cans 90 insufficient, a fallen can that is caused by the cans 90 being fallen over and is to be stacked as it is, and misalignment in which the cans 90 are misaligned and are to be stacked as they are. The abnormality detection system 50 detects the occurrence of the omitted can, the fallen can, the misalignment, and the like before being stacked on the pallet. This prevents the stacking of the cans 90 on the pallet with the abnormalities such as the omitted can, the fallen can, and the misalignment.

The abnormality detection system 50 detects the occurrence of abnormality on the basis of the image of the cans 90 aligned in the alignment unit 12. For this purpose, the abnormality detection system 50 includes an imaging apparatus 52 provided in the alignment unit 12. The imaging apparatus 52 is provided at an upper part on the downstream side of the alignment unit 12, and disposed such that an image of all the cans 90 pushed by the pushing machine 25 can be captured from above. In the present embodiment as an example, three imaging apparatuses 52 are provided side by side in the width direction of the alignment unit 12. The imaging apparatus 52 each continuously or intermittently capture an image of the cans 90 passing under the imaging apparatus 52 such that an image of all the cans 90 that are being moved by the pushing machine 25 is captured. The imaging apparatus 52 is connected to, for example, a Power over Ethernet (PoE) hub 54 but may be connected to other type of hub. The imaging apparatus 52 is supplied with power from the PoE hub 54 and transmits the captured image through the PoE hub 54.

The abnormality detection system 50 includes an abnormality detection apparatus 56. The abnormality detection apparatus 56 is a computer including an integrated circuit, such as a field programmable gate array (FPGA), an application specific integrated circuit (ASIC), or a central processing unit (CPU), and may be equipped with, for example, a graphics processing unit (GPU). The abnormality detection apparatus 56 acquires a captured image from the imaging apparatus 52 through the PoE hub 54. The abnormality detection apparatus 56 detects, by using the acquired image, abnormality such as an omitted can, a fallen can, or misalignment when the abnormality occurs.

The abnormality detection apparatus 56 is connected to the control apparatus 30 that controls the operation of the palletizer 10. When the abnormality detection apparatus 56 detects the abnormality, the abnormality detection apparatus 56 transmits a signal representing the abnormality detection to the control apparatus 30. The control apparatus 30 that has received the abnormality detection signal stops the stacking of the cans 90. At this time, the control apparatus 30 causes a notification apparatus 62 such as a display apparatus or a speaker, to output an alarm and the like indicating the occurrence of abnormality.

Abnormality Detection Method

An abnormality detection method performed by the abnormality detection apparatus 56 is described. The abnormality detection apparatus 56 acquires, as a determination target image, an image of the cans 90, which are determination target objects, to be regularly aligned at the alignment unit 12 from the imaging apparatus 52. The abnormality detection apparatus 56 creates a difference image emphasizing a difference between an image of the normal cans 90 regularly aligned and the determination target image acquired from the imaging apparatus 52.

In the present embodiment as an example, the abnormality detection apparatus 56 uses an autoencoder using a deep neural network. The autoencoder according to the present embodiment is configured such that an image of the normal cans 90 is output in response to input of an image of the normal cans 90 through, for example, unsupervised machine learning with a normal image that is an image of the cans 90 normally and regularly aligned. The abnormality detection apparatus 56 inputs the determination target image acquired from the imaging apparatus 52 into the autoencoder and acquires a reference image as output of the autoencoder. The abnormality detection apparatus 56 then creates a difference image by calculating a difference between the determination target image acquired from the imaging apparatus 52 and the reference image as the output of the autoencoder.

Figure 2:
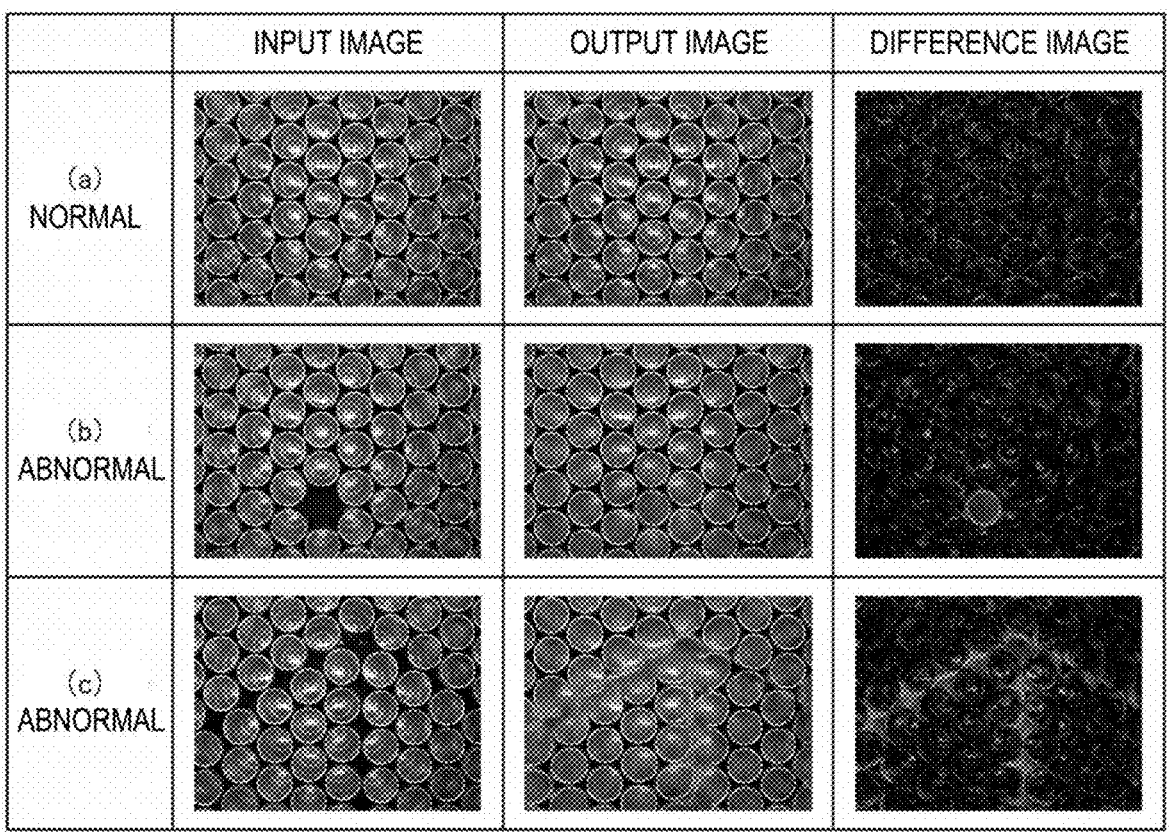
FIG. 2 illustrates examples of an input image into an autoencoder, an output image from the autoencoder, and a difference image therebetween for each of a normal case, an abnormal case with an omitted can, and an abnormal case with misalignment.

FIG. 2 illustrates examples of an input image and an output image into and from the autoencoder, and a difference image therebetween for each of (a) a normal case, (b) an abnormal case with an omitted can, and (c) an abnormal case with misalignment. In the normal case, the difference between the input image into the autoencoder configured as in the present embodiment and the output reference image is small, reducing the error determined from the difference image. On the other hand, in the case with abnormality, the difference between the input image into the autoencoder and the output reference image is large, increasing the error determined from the difference image. Thus, the abnormality detection apparatus 56 can determine whether the determination target object is normal or abnormal, i.e., the presence or absence of abnormality such as the omitted can, the fallen can, or the misalignment on the basis of the error determined from the obtained difference image.

In the present embodiment, introducing the autoencoder generated through machine learning into a small-sized computer equipped with the FPGA and the like allows the abnormality detection apparatus 56 to be disposed as an edge device in a factory where the palletizer 10 is installed. The abnormality detection apparatus 56 may be connected to a network, and configured to allow the autoencoder to be reorganized, relearned, reimplemented, or the like by remote control.

In the present embodiment, the manufactured can 90 is the determination target object. A mouse portion of the can 90 is slightly smaller than a barrel portion, and an image of a portion slanted from the barrel portion to the mouse portion of the can 90, called a shoulder portion is also captured when captured from above with the imaging apparatus 52. In addition, the manufactured can 90 has a print corresponding to a product on its outer periphery including the barrel portion and the shoulder portion. This print differs depending on the position of the outer periphery. The orientation in the circumferential direction of the can 90 to be aligned in the alignment unit 12 of the palletizer 10 is not particularly controlled, and thus the print on the shoulder portion has a different orientation for each can 90 in the determination target image captured by the imaging apparatus 52.

In the present embodiment, the image of the cans 90 that are being moved by the pushing machine 25 is acquired by the imaging apparatus 52 as the determination target image. As a result, the positions of the cans 90 in the determination target image differ depending on the images.

Due to characteristics of the determination target image, the present embodiment has a large noise in the difference image as can be seen from the normal case (a) in FIG. 2. Accordingly, in the present embodiment, the error of the difference image increasing in the abnormal case is likely to be buried in noise. In view of this, the present embodiment uses a determination method that can appropriately perform abnormality detection even with such a large noise in the difference image.

First Determination Method

Figure 3:
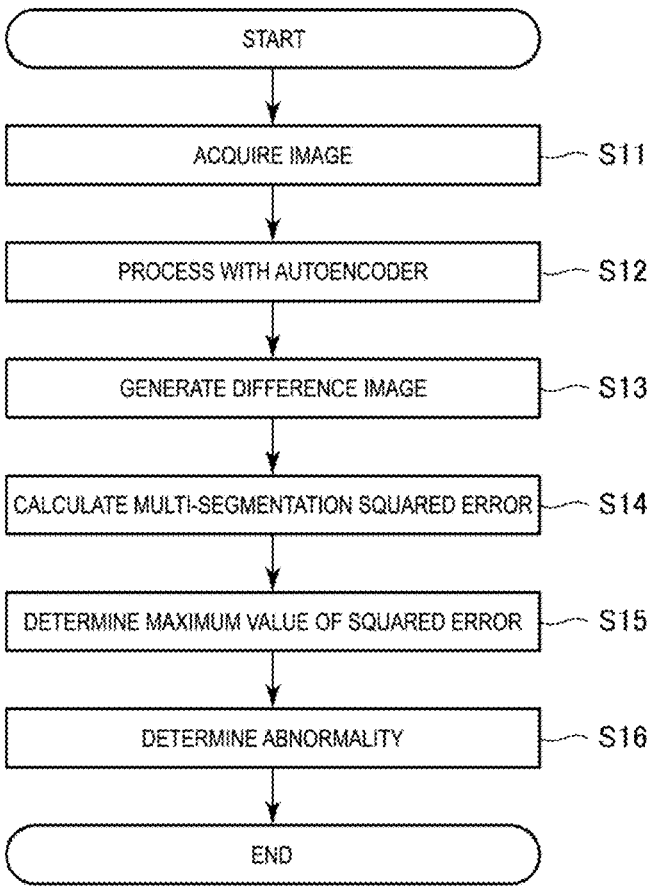
FIG. 3 is a flowchart schematically illustrating a determination process using a first determination method.

The determination whether the determination target object is normal or abnormal using a first determination method is described. FIG. 3 is a schematic flowchart illustrating an abnormality detection method using the first determination method. The process related to this abnormality detection method is executed by a series of programs in the abnormality detection apparatus 56.

At step S11, the abnormality detection apparatus 56 acquires the image obtained by using the imaging apparatus 52 as a determination target image. At step S12, the abnormality detection apparatus 56 inputs the acquired determination target image into the autoencoder having the above-described configuration, and obtains a reference image as an output image. At step S13, the abnormality detection apparatus 56 creates the difference image of the determination target image acquired at step S11 and the reference image acquired at step S12. At step S14, the abnormality detection apparatus 56 calculates the multi-segmentation squared error for the difference image. Here, the multi-segmentation squared error difference is a squared error of the difference image obtained for each region of the difference image divided into a plurality of regions. The squared error is calculated as the sum of squares of the difference in luminance values between the reference image and the determination target image for each image. At step S15, the abnormality detection apparatus 56 determines the maximum value of the squared error of each divided region calculated at step S14 to be the evaluation value. At step S16, the abnormality detection apparatus 56 determines whether it is normal or abnormal for the determination target image on the basis of the maximum value determined at step S15 as the evaluation value. For example, the abnormality detection apparatus 56 determines that it is abnormal when the determined maximum value is greater than a predetermined threshold value, and the abnormality detection apparatus 56 determines that it is normal when the maximum value is equal to or smaller than the predetermined threshold value.

Example of Determination

The processes of steps S11 to S15 described with reference to FIG. 3 were performed for 30198 normal determination target images and six abnormal determination target images. Here, at step S12, an autoencoder configured through unsupervised learning with a deep neural network with 36222 normal images as the learning data was used. At step S14, a squared error as the multi-segmentation squared error, was calculated for each region of the image obtained by dividing the image into two in the vertical direction and three in the lateral direction, six in total. At step S15, the maximum value of the squared error was determined to be the evaluation value.

Figure 4:
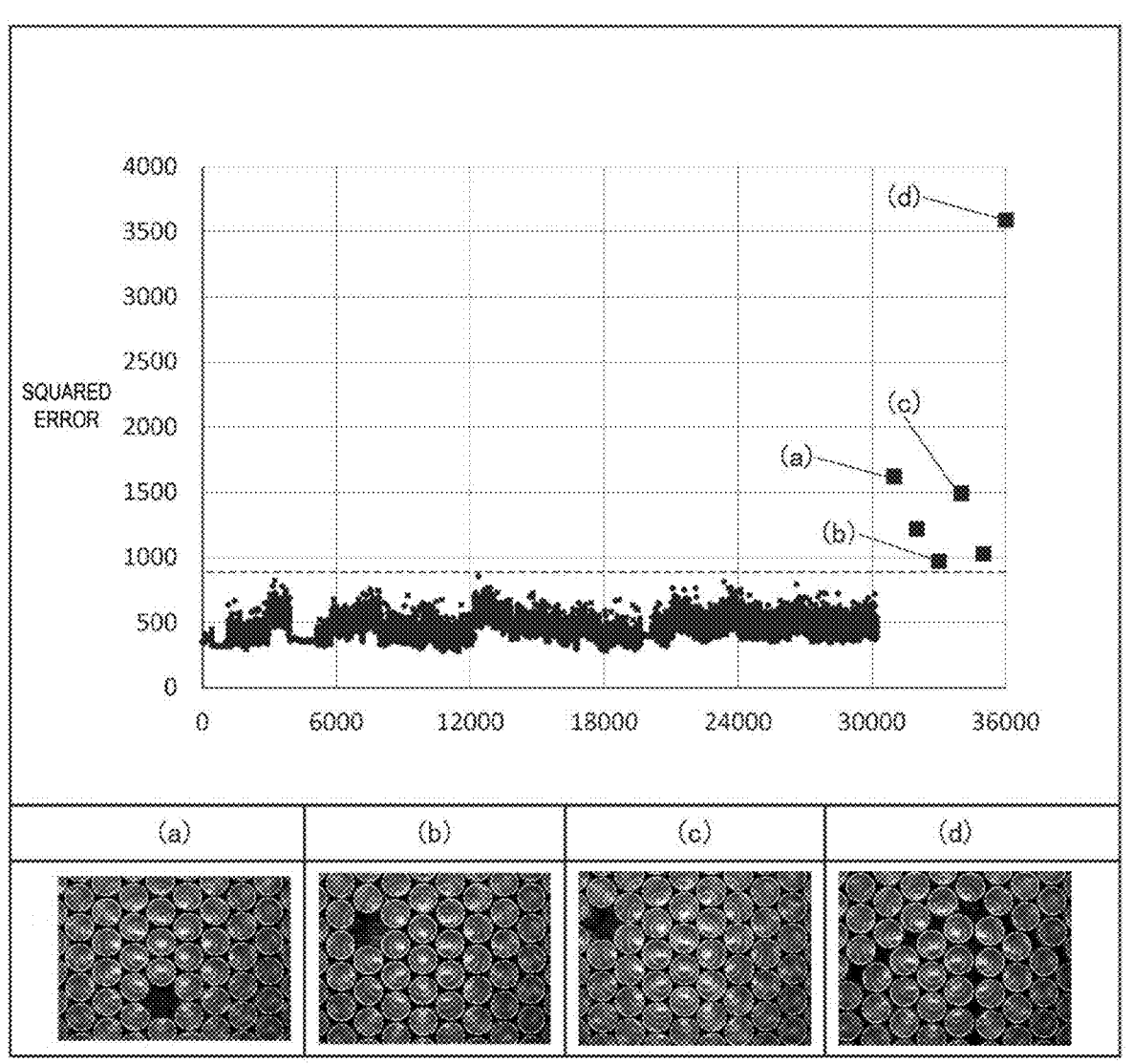
FIG. 4 is a diagram illustrating an example of an evaluation value acquired by using the first determination method for a plurality of determination target images.

FIG. 4 shows the obtained result of the process. In FIG. 4, the ordinate indicates the maximum value of the six-segmentation squared error as the evaluation value, with the circles on the left representing evaluation values for the image of the normal case, and the squares on the right representing evaluation values for the image of the abnormal case. (a) to (d) attached to the squares for abnormalities are values of the images (a) to (d) illustrated on the lower side in the drawing, respectively.

As a comparative example, the squared error of the entire difference image was calculated as the evaluation value without dividing the region instead of processes of steps S14 and S15 for the same image. The result is shown in FIG. 5.

Figure 5:
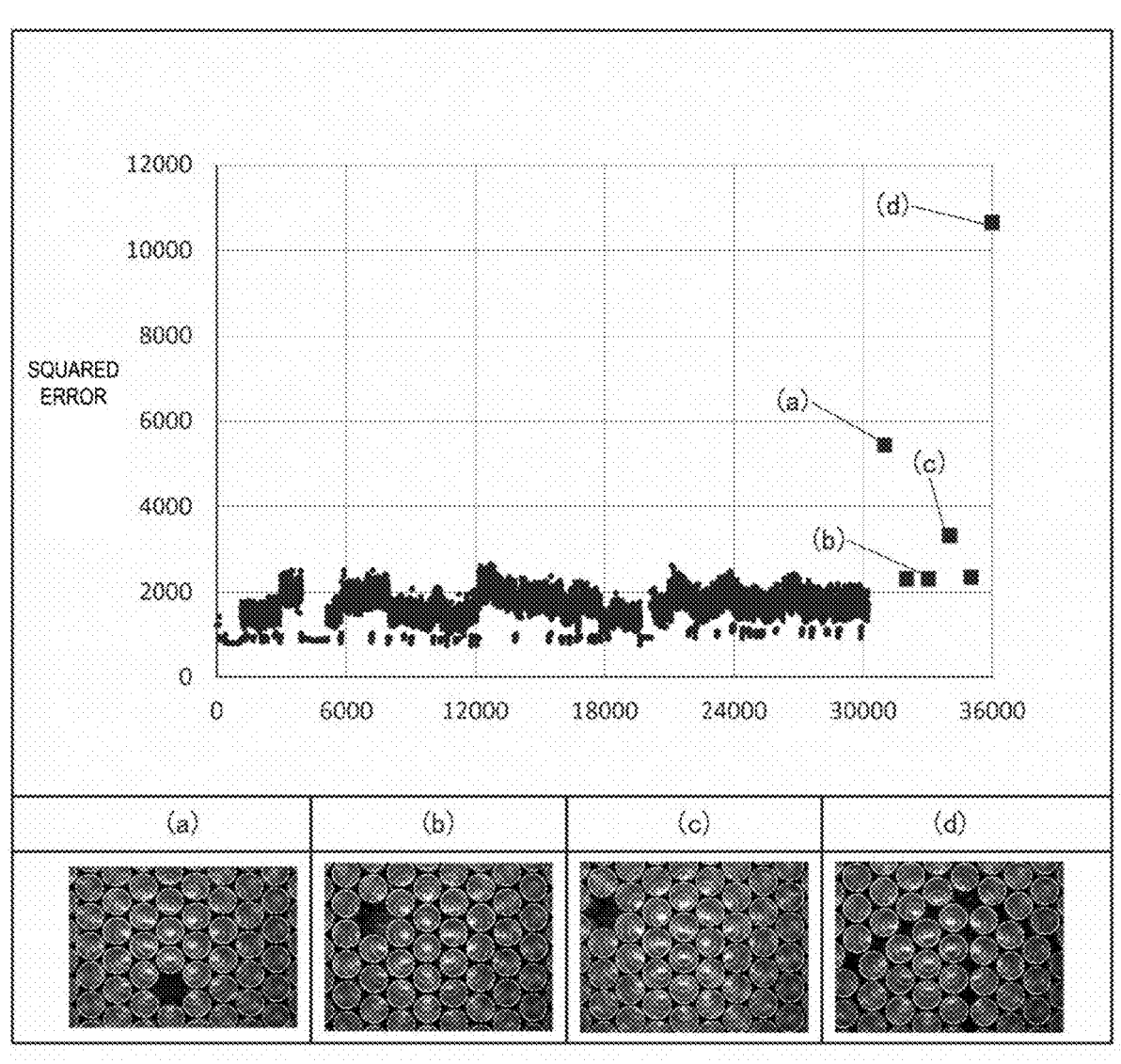
FIG. 5 is a diagram illustrating an example of an evaluation value acquired by using a method according to a comparative example for a plurality of determination target images.

As illustrated in FIG. 5, when the squared error for the entire difference image was calculated, the normal case cannot be discriminated from the abnormal case on the basis of its value. On the other hand, it was confirmed that using the maximum value of the six-segmentation squared error as illustrated in FIG. 4 allows a threshold value as indicated with the broken line in the graph of FIG. 4 to be set and the normal case to be discriminated from the abnormal case.

Second Determination Method

Figure 6:
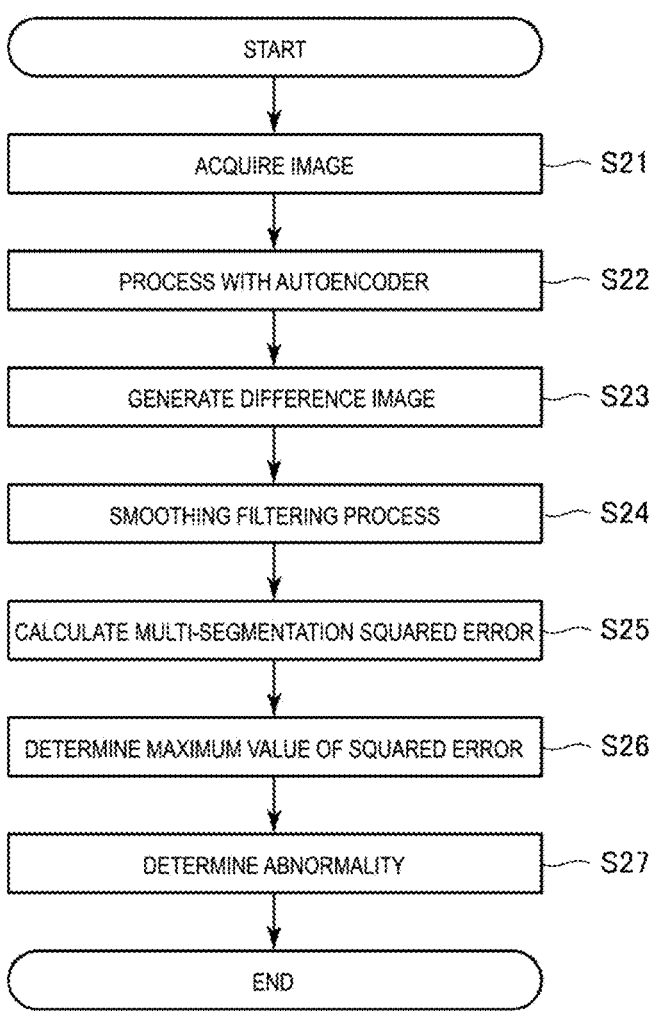
FIG. 6 is a flowchart schematically illustrating a determination process using a second determination method.

The determination whether the determination target object is normal or abnormal using a second determination method is described. FIG. 6 is a schematic flowchart illustrating an abnormality detection method using the second determination method. The second determination method differs from the first determination method in that a process using a smoothing filter is performed for a created difference image and that the multi-segmentation squared error is calculated for the image after the filtering process.

Steps S21 to S23 of the second determination method are the same as steps S11 to S13 of the first determination method. Specifically, the abnormality detection apparatus 56 acquires the determination target image from the imaging apparatus 52 at step S21, inputs the acquired determination target image into the autoencoder to obtain the input reference image at step S22, and creates the difference image of the input image and the reference image at step S13.

At step S24, the abnormality detection apparatus 56 subjects the difference image to smoothing filtering process. The smoothing filter used may be various filters for removing noise such as averaging filters, median filters, and Gaussian filters, for example.

Steps S25 to S27 of the second determination method are the same as steps S14 to S16 of the first determination method. Specifically, the abnormality detection apparatus 56 calculates the multi-segmentation squared error for the difference image after the smoothing filtering process at step S25, determines the maximum value thereof at step S26, and determines whether it is normal or abnormal for the determination target image on the basis of the determined maximum value at step S27.

Example of Determination

As with the results shown in FIGS. 4 and 5, the processes of steps S21 to S26 described with reference to FIG. 6 were performed for 30198 normal determination target images and six abnormal determination target images. Here, an average filter was used as the smoothing filter of step S24. Other points are the same as the examples of the determination related to the above-described first determination method.

Figure 7:
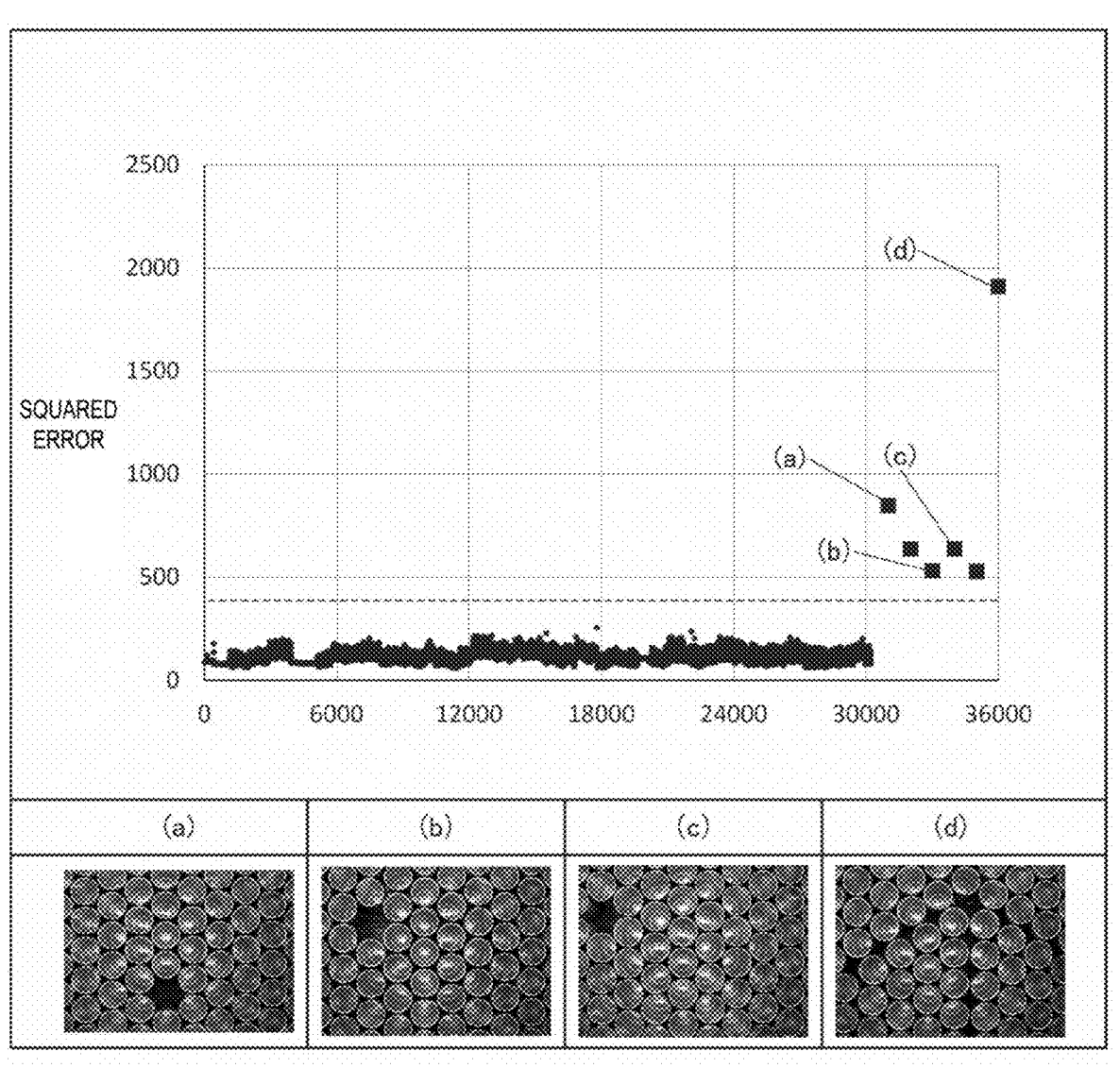
FIG. 7 is a diagram illustrating an example of an evaluation value acquired by using the second determination method for a plurality of determination target images.

FIG. 7 shows the obtained result of the process. In FIG. 7, as in FIG. 4, the ordinate indicates the maximum value of the six-segmentation squared error as the evaluation value, with the circles on the left representing evaluation values for the image of the normal case, and the squares on the right representing evaluation values for the image of the abnormal case. (a) to (d) attached to the squares for abnormalities are values of the images (a) to (d) illustrated on the lower side in the drawing, respectively.

As illustrated in FIG. 7, it was confirmed that with the second determination method including the smoothing filtering process, the obtained maximum value of the six-segmentation squared error largely differs between the normal case and the abnormal case, and whether it is normal or abnormal can be more correctly determined in comparison with the first determination method.

As described above, with the palletizer system 1 including the abnormality detection system 50 according to the present embodiment, abnormalities can be accurately detected before the stacking of the cans 90 onto the pallet. As a result, generation of defective parts can be prevented. Specifically, the site where the cans 90 are stacked by the palletizer 10 is generally mechanized, and human intervention is often not possible. With the palletizer system of the present embodiment 1, abnormalities can be advantageously accurately detected without human intervention. Since the stacking of the cans 90 with the palletizer 10 is the final stage of the manufacturing process and is the step immediately before the shipment of the product, the abnormality detection at this stage is especially important for preventing the generation of defective parts, and the effect of the abnormality detection system 50 of the present embodiment is particularly significant.

The palletizer system 1 of the present embodiment detects abnormalities on the basis of the image captured by the imaging apparatus 52. Alternatively, it is conceivable to detect the fallen can, the omitted can or the like by using various sensors such as ultrasound sensors, optical sensors, and pressure sensors. In this case, however, it is necessary to install a large number of sensors to confirm the status of all of the plurality of cans 90 aligned in the width direction. On the other hand, the analysis in accordance with the image as in the present embodiment can effectively acquire a wide range of information with a small number of cameras.

In addition, with the detection using the sensors described above, it is necessary to adjust the sensors each time the condition of the can 90 changes such as when it is switched to manufacture the can 90 of a different type, for example. In particular, such an adjustment is required for all of a large number of required sensors as described above. On the other hand, according to the present embodiment, the autoencoder for detecting abnormalities of the cans 90 of different types can be relatively easily generated, and, even when the can 90 to be manufactured is changed, the change can be coped with by simply changing the autoencoder introduced in the abnormality detection apparatus 56.

The same analysis as that of the above-described determination example was also performed for the cans 90 with different diameters, and it was confirmed that the abnormality detection system 50 according to the present embodiment functions in the same manner also for the cans 90 with different diameters.

In addition, the abnormality detection apparatus 56 of the present embodiment uses the autoencoder using machine learning, and therefore it is relatively easy to achieve highly accurate detection of various states, which is difficult with known rule-based image analysis. In the present embodiment, in particular, the abnormality detection apparatus 56 is configured such that the determination is appropriately performed even for the determination target images with a lot of noise in the difference image due to the shoulder of the can 90 included in the image and acquisition of the image during the movement by dividing the image into a plurality of regions and calculating the squared error to use the maximum value thereof as the evaluation value used for determination, and/or by performing a process using the smoothing filter in the middle of the process. The fact that the determination can be accurately performed even for images including the shoulder of the can 90 means that the abnormality detection apparatus 56 according to the present embodiment achieves an extremely high degree of freedom in terms of the determination target object. In addition, the fact that the determination can be accurately performed even for images acquired during movement means that the abnormality detection apparatus 56 according to the present embodiment achieves less limitation about acquisition of images, and an extremely high degree of freedom in terms of the system design including physical points such as the performance of the imaging apparatus, the installation location of the imaging apparatus, and image capturing condition.

Supplementary Notes

The abnormality detection system may have a multilayered configuration by additionally providing ultrasound sensors, optical sensors, pressure sensors for detecting the omitted can or the fallen can and the like in addition to the above-described abnormality detection system 50 so that no abnormality is left undetected. For example, it is conceivable to provide a falling sensor at that position because the fallen can tends to easily occur at the outlet of the supply unit 11, and it is conceivable to provide an omission sensor at the outlet of the alignment unit 12.

Although the disclosure has been described above with reference to the preferred embodiments, the disclosure is not limited only to the embodiments described above, and various modifications can be made within the scope of the disclosure.

In the above-described embodiment, the autoencoder through deep learning is used as an example to acquire the difference image emphasizing the difference between the image of the cans 90 that are normal determination target objects regularly aligned, and the determination target image acquired by the imaging apparatus 52. However, other methods that can obtain the difference image emphasizing the difference between the image of the normal determination target object and the determination target image may be used without limitation.

Examples of the error to be used for the evaluation include an example of using the sum of the squares of the difference of the pixel value for each divided region but are not limited to the example. Other values may be used as long as the value is a value representing the error in the difference image of each divided region, i.e., a multi-segmentation error.

The embodiment described above illustrates an example in which the abnormality detection system 50 is applied to the palletizer 10 that stacks manufactured cans onto the pallet but is not limited to the example. For example, the abnormality detection system 50 may be applied to a step related to other containers such as resin containers in addition to cans. Such containers may be empty or filled with content. In addition, the abnormality detection system 50 may be applied to another step where containers are regularly aligned in addition to the palletizer.

The contents of the documents described in this description and the description of the Japanese application that is the basis of Paris priority of the present application are all incorporated herein.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. An abnormality detection method, comprising:

acquiring a determination target image that is an image of a determination target object to be regularly aligned while standing, which is a cylindrical container;

creating a difference image emphasizing a difference between an image of a normal determination target object regularly aligned and the determination target image;

calculating a multi-segmentation error of the difference image to determine a maximum value of the multi-segmentation error; and determining whether the determination target object is normal or abnormal in accordance with the maximum value, wherein the creating the difference image includes acquiring, by inputting the determination target image into an autoencoder configured such that an image of a normal determination target object is output in response to input of an image of a normal determination target object through learning with an image of a normal determination target object regularly aligned, a reference image as output of the autoencoder; and creating the difference image by calculating a difference between the determination target image and the reference image.

2. The abnormality detection method according to claim 1, further comprising:

subjecting the difference image to smoothing filtering process before the calculating the multi-segmentation error, wherein the multi-segmentation error is calculated for the difference image subjected to the smoothing filtering process.

3. The abnormality detection method according to claim 1, wherein the determination target object corresponds to a plurality of containers to be stacked on a pallet; and the autoencoder is generated through learning with a normal image of the plurality of containers aligned and to be stacked on the pallet.

4. The abnormality detection method according to claim 3, wherein the determination target image includes an image obtained by capturing the determination target object that is being moved.

5. The abnormality detection method according to claim 1, wherein the determining includes comparing the maximum value with a predetermined threshold value and determining that it is abnormal when the maximum value is greater than the predetermined threshold value.

6. A non-transitory computer-readable storage medium having computer-executable instructions stored thereon, which when executed by one or more processors, cause the one or more processors to perform operations comprising the abnormality detection method according to claim 1.

7. An abnormality detection apparatus comprising a computer configured to execute the abnormality detection method according to claim 1.

8. An abnormality detection system in a palletizer, the abnormality detection system, comprising:

an imaging apparatus configured to capture an image of a plurality of containers aligned before the plurality of containers is stacked on a pallet; and an abnormality detection apparatus including a computer configured to execute the abnormality detection method according to claim 4, the abnormality detection apparatus being configured to acquire, as a determination target image, the image captured by the imaging apparatus and determine whether the plurality of containers to be stacked on the pallet is normal or abnormal.

9. The abnormality detection system in the palletizer according to claim 8, further comprising:

a falling sensor configured to detect a fallen container; and an omission sensor configured to detect omission of a container.

* * * * *